(12) United States Patent
Levine et al.

(10) Patent No.: US 6,668,106 B1
(45) Date of Patent: Dec. 23, 2003

(54) CROSSPOINT MICROWAVE SWITCHING ARCHITECTURE FOR OPTICAL TELECOMMUNICATIONS

(75) Inventors: Jules D. Levine, Santa Clara, CA (US); Thomas W. Myers, Sunnyvale, CA (US); Christopher Weller, Sunnyvale, CA (US)

(73) Assignee: Teraburst Networks, Inc., Sunnyvale, CA (US)

( * ) Notice: Subject to any disclaimer, the term of this patent is extended or adjusted under 35 U.S.C. 154(b) by 360 days.

(21) Appl. No.: 09/792,287

(22) Filed: Feb. 23, 2001

Related U.S. Application Data
(60) Provisional application No. 60/185,041, filed on Feb. 25, 2000.

(51) Int. Cl.[7] .............................. G02B 6/26; H01P 5/12; H04J 14/00
(52) U.S. Cl. .............................. 385/16; 385/17; 385/24; 385/40; 333/113; 333/114; 333/21 R; 398/45; 398/50; 398/56; 398/82; 398/83
(58) Field of Search .............................. 385/1, 2, 3, 14, 385/16, 17, 18, 24, 39, 40, 42, 129, 130, 131, 132; 333/113, 114, 21 R; 398/45, 50, 56, 82, 83

(56) References Cited

U.S. PATENT DOCUMENTS

| | | | | |
|---|---|---|---|---|
| 4,005,927 A | * | 2/1977 | Caton ............................ | 385/8 |
| 4,399,439 A | | 8/1983 | Upadhyayula ......... | 340/825.91 |
| 4,420,873 A | * | 12/1983 | Leonberger et al. ........... | 438/31 |
| 4,736,463 A | * | 4/1988 | Chavez ....................... | 359/107 |
| 4,779,065 A | | 10/1988 | Katz et al. .................. | 333/101 |
| 5,125,051 A | * | 6/1992 | Goutzoulis et al. ........... | 385/27 |
| 5,148,129 A | * | 9/1992 | Bolton ........................ | 333/20 |
| 5,220,627 A | * | 6/1993 | Kawano et al. ................ | 385/3 |
| 5,311,196 A | * | 5/1994 | Hanson et al. ............... | 342/368 |
| 5,991,491 A | * | 11/1999 | Madabhushi ................ | 385/131 |

FOREIGN PATENT DOCUMENTS

EP  0 978 968 A2  2/2000  ........... H04L/12/56

OTHER PUBLICATIONS

Marcos A. Bergamo: "Terminal System and Capability for ARPA–NASA High–Speed SONET/ATM Experiments Over NASA's Advanced Communications Technology Satellite", Military Communications Conference MILCOM93 IEEE, Oct. 11–14, 1993, pp. 235–241.

Lehr, et al. "Management of All–Optical WDM Networks: First Results of European Researcg Project MOON" Network Operations and Management Symposium, 1998, IEEE New Orleans, LA Feb. 15–20, 1998, pp. 870–879.

Freeman, Roger L., "Reference Manual For Telecommunications Engineering," Second Edition, Wiley Publications, New York, 1994, pp. 1387–1391.*

Catalog 500, Wireless and Military Semiconductors, Jun. 2000,pp. 66–69, 87–93.*

Sze, S.M., "Physics of Semiconductor Devices", Second Edition, A Wiley–Interscience Publication, 1981, pp. 117–122.*

* cited by examiner

*Primary Examiner*—Brian Healy
(74) *Attorney, Agent, or Firm*—Katten Muchin Zavis Rosenman

(57) ABSTRACT

The present invention combines several features to create a novel type of optical telecommunications switching component using microwave waveguides as opposed to the usual methods employing light deflection or digital signal processing. Some of the components of the device include: (1) an optical crossconnect (OXC) which allows any combination of wavelengths to be added or dropped from an element to an optical network, (2) an optical add/drop multiplexer (OADM) which allows any wavelength to be converted to any other, (3) a microwave crossbar switch array optimized for this purpose, and (4) a means for reshaping the exiting signal from the microwave crosspoint switch array without regard to signal format and without need for complex and expensive digital signal processing. The minimal architecture for this functionality is shown to be three N×N microwave crossbar switch arrays.

20 Claims, 15 Drawing Sheets

CROSSPOINT MICROWAVE SWITCHING ARCHITECTURE FOR OPTICAL TELECOMMUNICATIONS

This application claims the benefit of Provisional Application No. 60/185,041, filed Feb. 25, 2000.

BACKGROUND OF THE INVENTION

1. Field of Invention

The present invention relates to optical processing, and more particularly to the regeneration, reshaping and retiming of optical signals using analog microwave technology.

2. Description of Related Art

The telecommunications industry uses two types of signal processing—optical and electronic. Historically, optical processing has high transmission rates but has had very limited switching capabilities, whereas electronic processing has allowed for complex switching features, but transmission rates, especially as compared to optical processing, that are relatively slow.

A typical optical switching element used in the telecommunications industry is called a crosspoint switch. For the more usual case where there are N inputs and N outputs, this is called is called an N×N array. For the case when there are M inputs and N outputs, this is called an M×N rectangular array.

A crosspoint switch based on optical technology is called a wavelength crossconnect WXC and consists of a multiplicity of mirrors. Light signals on input wavelengths $\lambda_1, \lambda_2, \lambda_3, \ldots, \lambda_N$ is converted by the WXC to light signals on output wavelengths $\lambda_1', \lambda_2', \lambda_3', \ldots, \lambda_N'$. FIG. 1 shows schematic diagram of an N×N crosspoint switch using optical technology. At each node there is the possibility of a connection between the input rows and the ouptut columns.

In such a wavelength crosspoint switch, the multiplicity of mirrors requires a large number of movable parts, and correspondingly causes an increase in the complexity and cost.

The bit rate B of information flow in each optical stream at each wavelength can be any one of the standard values. For example, B=2.5, 10, and 40 Gbps, for OC48, OC 192 and OC 768, respectively. The general trend is for the higher bit rates.

In FIG. 1, the array size is drawn for N=6. However, the array size for a crossconnect application will typically be appreciably larger, being large enough to accommodate about 100 fibers in each cable and about 20 wavelengths in each fiber. A typical crossconnect switch can therefore have N of about 2,000 to best optimize the performance of the communication network. Since some of these inputs simply let some wavelengths through without modification, it is possible to reduce the size of this crossconnect array to an N of about 1000 in certain circumstances.

Different chips in the industry have different values of B and N. The optimal values of the data points result in the general shape of a hyperbola, as shown in FIG. 2. For individual chips, large values of B can be obtained at small values of N and vice versa. What is desired is a combination of large values of B and N as shown by the circle in the figure.

It is possible to use tiling to assemble a multiplicity of chips into a system. FIG. 3 shows an example of tiling of 9 individual chips to make a system. The system of 9 chips is shown within the bold line. All interconnections are made on a printed circuit board and carry the full bit-rate. For example 100 68×68 chips can be, arranged to form a larger array of 10*68×10*68=680×680. Tiling obviously requires appreciable cost, especially at the higher bit-rates and larger array sizes.

In order to prevent degradation to the optical signal, grooming is required. There are three components to grooming 1R, which consists of regeneration, 2R, which consists of regeneration and reshaping, and 3R, which consists of regeneration, reshaping and retiming. In general, 3R components are more costly than 2R components, which are more costly than 1R components.

An example of a 1R component is an optical crossconnect that includes an array of optical mirrors that move a light beam with certain wavelength from one spatial position to another. This neither reshapes or retimes the optical signal.

An example of 2R component is described in a paper by P. E. Green et al entitled "WDM Protocol-Transparent Distance Extension Using R2 Remodulation", IEEE Journal on Selected Areas in Communications, Vol 14, No. 5, (1966). The shape of a pulse is degraded after passing through many kilometers of fiber and many switches and amplifiers. A slicing circuit is used to sample and determine the mid-height of the rising portion of each degraded pulse, and the output from the slicing circuit drives a modulator to create a new square-shaped pulse in its place. But a large number of these shaping circuits are required, one for each wavelength. In the above example, this involves 128 such circuits in parallel. Furthermore at bit rates ~10 Gb/s it is very difficult to design the last decision/driver stage, corresponding to the conversion from electrical to optical signals. Accordingly, such 2R components have not been widely used.

Conventional crosspoint switching arrays involve digital switches at each of the array nodes, and these digital switches also inadvertently provide some 2R functionality. The problem of these digital switches is that they must operate at the full bit-rate, which is very difficult, especially for bit-rates of 10–40 Gbps. An example is a Triquint crosspoint array, rated at 2.5 Gbps for a 16×16 array. These recent components have a very small product of bit-rate B and array size N and as such have limited utility in replacing optical crosspoint arrays. The crosspoint arrays described in this invention are very different than conventional crosspoint switching arrays, in major part since the crosspoint arrays of the present invention use analog switches instead of digital switches, as described further hereinafter.

An example of a generalized 3R electronic switch is Alcatel's optical add-drop multiplexer (OADM) as described in the Ramaswami article entitled "Optical Networks: A Practical Perspective" Morgan Kaufmann Publishers, San Francisco, Calif. (1998). The optical signals are converted to digital electronic signals, which are reshaped and retimed using digital signal processing techniques. The electronic signals are then used to modulate an optical beam, thereby producing an improved 3R optical signal.

Present telecommunication systems primarily use 1R components and 3R components within the system on an as needed basis in order to ensure signal integrity. Thus, these 1R and 3R components are positioned in various locations in a network. Historically, that has led to the widespread usage of 3R components in many locations within a network. While this has ensured that signal integrity has been maintained, the cost of the 3R components has been quite high.

SUMMARY OF THE INVENTION

It is an object of the present invention to provide a hybrid 2R component, which involves local regeneration and reshaping of the signal waveform in the analog microwave domain.

It is a further object of the invention to provide a hybrid 2R component with a more general functionality, including full wavelength switching and add/drop capability.

In order to attain the above object of the present invention, among others, the present invention provides a 2R component that uses microwave waveguides as opposed to the usual methods employing light deflection or digital signal processing. A preferred embodiment of the present invention includes: (1) an optical crossconnect (OXC) which allows any combination of wavelengths to be added or dropped from an element to an optical network, (2) an optical add/drop multiplexer (OADM) which allows any wavelength to be converted to any other, (3) a microwave crossbar switch array optimized for this purpose, and (4) a means for reshaping the exiting signal from the microwave crosspoint switch array without regard to signal format and without need for complex and expensive digital signal processing. The minimal architecture for this functionality is shown to be three N×N microwave crossbar switch arrays.

Accordingly, the present invention enables an improved 2R component, which has advantages that will become apparent, particularly in the ability to provide renegeneration and reshaping of the signal waveform using a combination of components that can be provided for at costs that are much less than costs for 3R components and other 2R components. As a result, in a telecommunications system, fewer 3R components and fewer more costly 2R components are necessary, and the overall cost of the network can be substantially reduced.

DETAILED DESCRIPTION OF THE EXEMPLARY EMBODIMENTS

The description of the present invention provided herein describes features of a 2R component that allows for regeneration and reshaping using analog microwave technology.

The switching speed requirements of the present invention achieve two objectives. First, the full data rate must pass through the 2R component is 2.5 Gb/sec for OC 48, 10 GB/s for OC 192 and 40 Gb/s for OC 768. Second, the switches within the crosspoint array are preferably analog switches, as described in Attachment 1 hereinafter. Conventional devices are therefore not optimized for the purpose of this invention and it leaves much room for system tradeoffs which will be described later.

The present invention thus provides for 2R analog functionality, which is a reshaping function. Reshaping of the digitally modulated optical signal is necessary for two reasons. First, the 2R component obtained by the present invention is preferably a plug-in replacement for an existing device having a reshaping function, which is needed to remove noise generated within the fiber. Therefore the output from the new device must also be reshaped. Second, this reshaping function will compensate for any additional noise and distortion generated by microwave crosspoint switch array within the 2R component of the present invention, which, to the extent it exists, must be removed before sending the signal to the system.

An architecture of the 2R component of the present invention is described below, which architecture provides for sufficient generality to reshape all digital signals using only analog microwave techniques.

Figure 1:
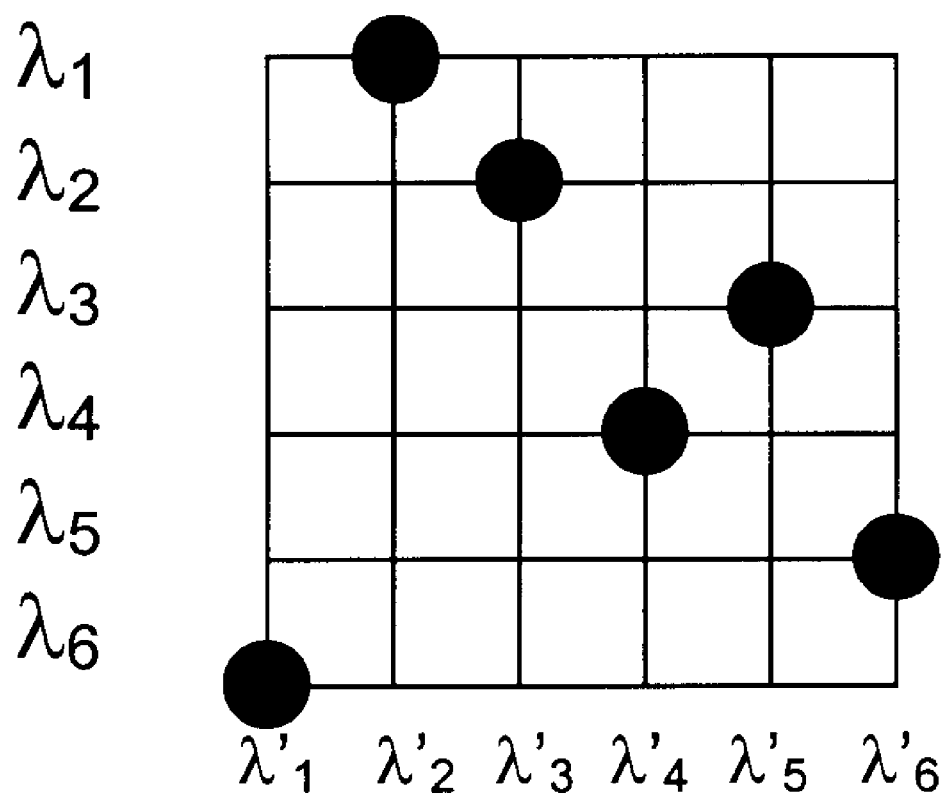
FIG. 1 illustrates a schematic diagram of an N×N crosspoint switch using optical technology.
Figure 2:
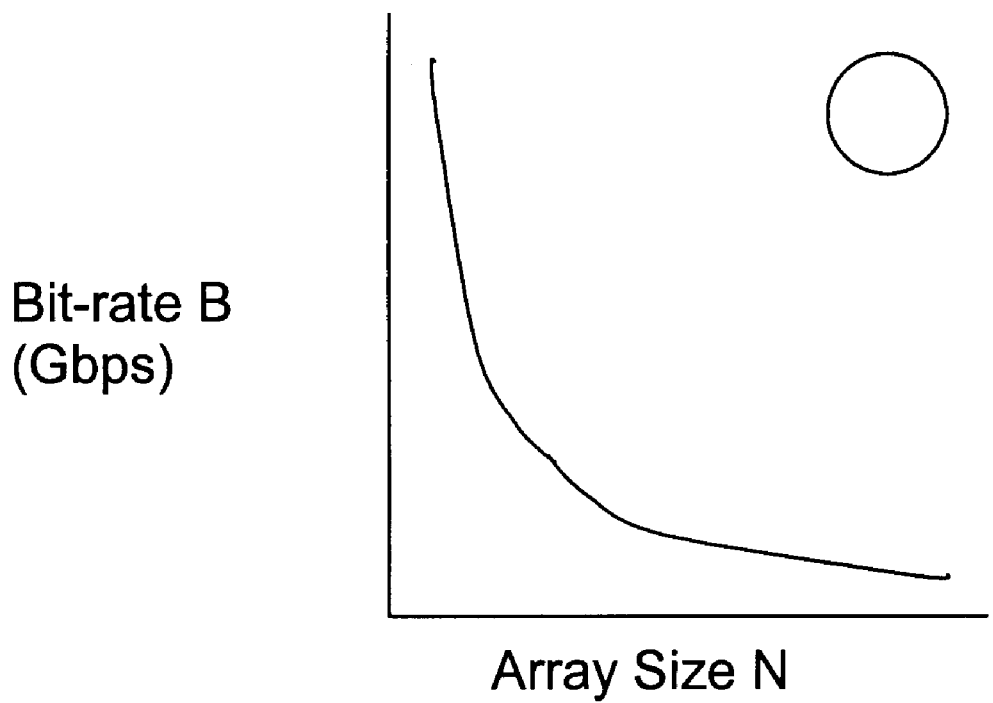
FIG. 2 provides a schematic representation of best values of Bit-rate and Array Size of individual chips from the literature.
Figure 3:
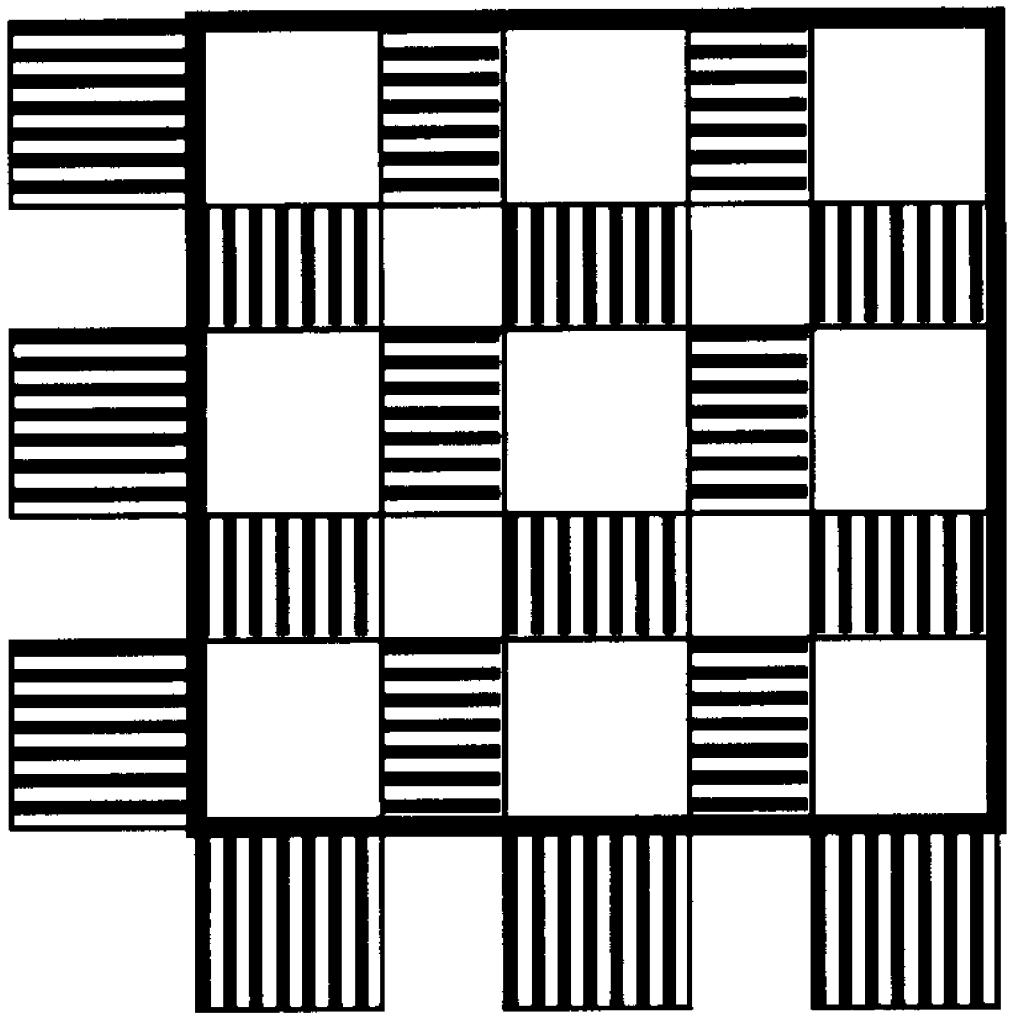
FIG. 3 illustrates an example of tiling of 9 individual chips to make a system.
Figure 4:
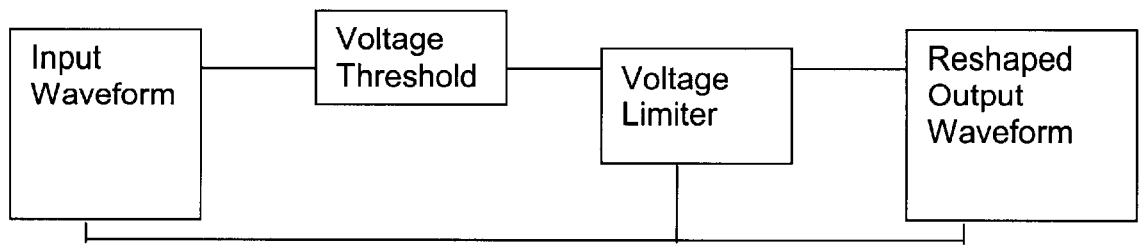
FIG. 4 illustrtes an analog reshaping circuit according to the present invention.
Figure 5:
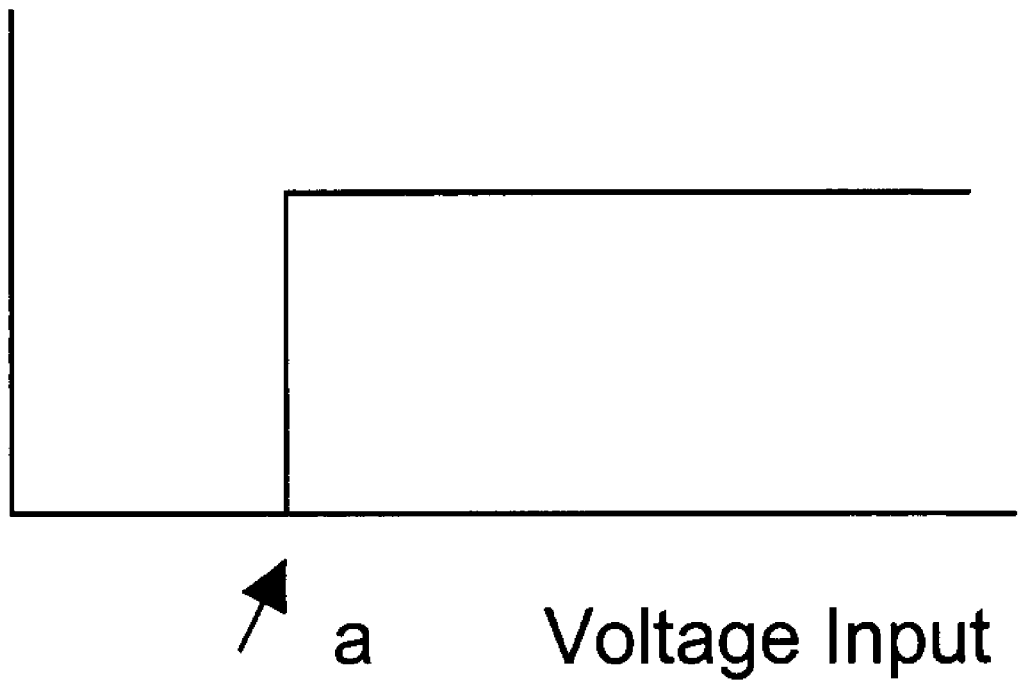
FIG. 5 illustrates an output output as a function of input with threshold at point "a"
Figure 6:
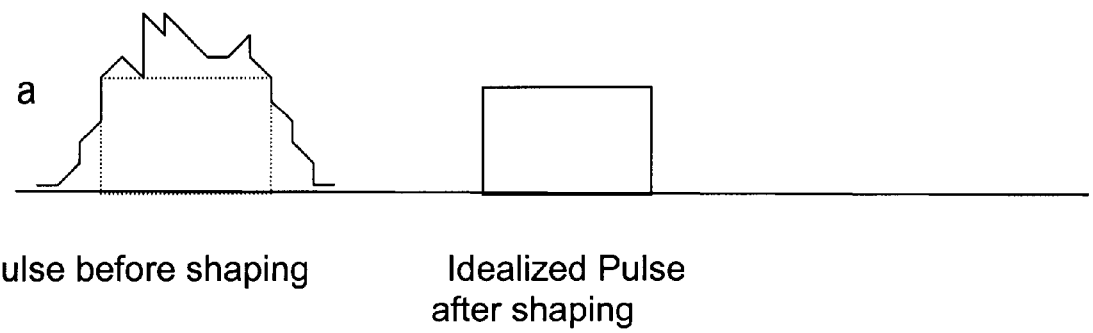
FIG. 6 illustrates analog pulse shaping diagrams.

According to the present invention, an input digital signal imposed on light can be reshaped using only inexpensive analog elements that can be integrated on a chip. There is generally a multiplicity of such signals in the intended crosspoint array. For example the array can be 100×100 which involves 100 such signals to be processed. To best service this multiplicity, it is best to integrate functionality on a single chip instead of adding extra chips. Thus, each each signal can be passed through an analog circuit on the same chip. Each has a voltage threshhold and a voltage limiter, as illustrated in FIG. 4, which shows a block diagram characterization of an analog reshaping circuit. This circuit has an idealized transfer function shown in FIG. 5, which shows output as a function of Input with threshold at point "a." An example of a voltage threshold device is a forward biased Schottky diode and an example of a voltage limiter is a a Zener diode placed in shunt. An example of RF pulse shaping by this circuit is shown in FIG. 6, which illustrates a pulse before shaping and an idealized pulse after shaping.

A great advantage of this analog circuit is the lower cost and greater ease of integration on each of the output lines of the N×N crosspoint array. The circuit is transparent to all types of optical pulse streams. This means that it doesn't matter if the digital data stream is arranged in a return-to-zero RZ or not-return-to-zero NRZ format.

Retiming was discussed above as providing for a full R3 conversion. The retiming function uses a microwave retiming circuit, which uses an analog method to sample the clock rate and trigger the modulator to fire at a multiple of the clock time. This will reduce jitter.

It is also possible to sample the delay by analog means and send a correction signal to the modulator. An example of error correction is the introduction of a bit in a string of more than 7 bits.

Thus, to process N input wavelengths and N output wavelengths with all permutations it is necessary to include a structure with sufficient generality. In a preferred embodiment of the present invention, this is achieved using a N×N crossbar array operating in the microwave regime using analog switches as opposed to digital switches.

The overall function of the analog crossconnect switch described herein allows for the adding and dropping of wavelengths. In the general add/drop case, there are N input wavelengths and N output wavelengths with N shapers and N retimers needed for full 3R functionality.

Figure 7:
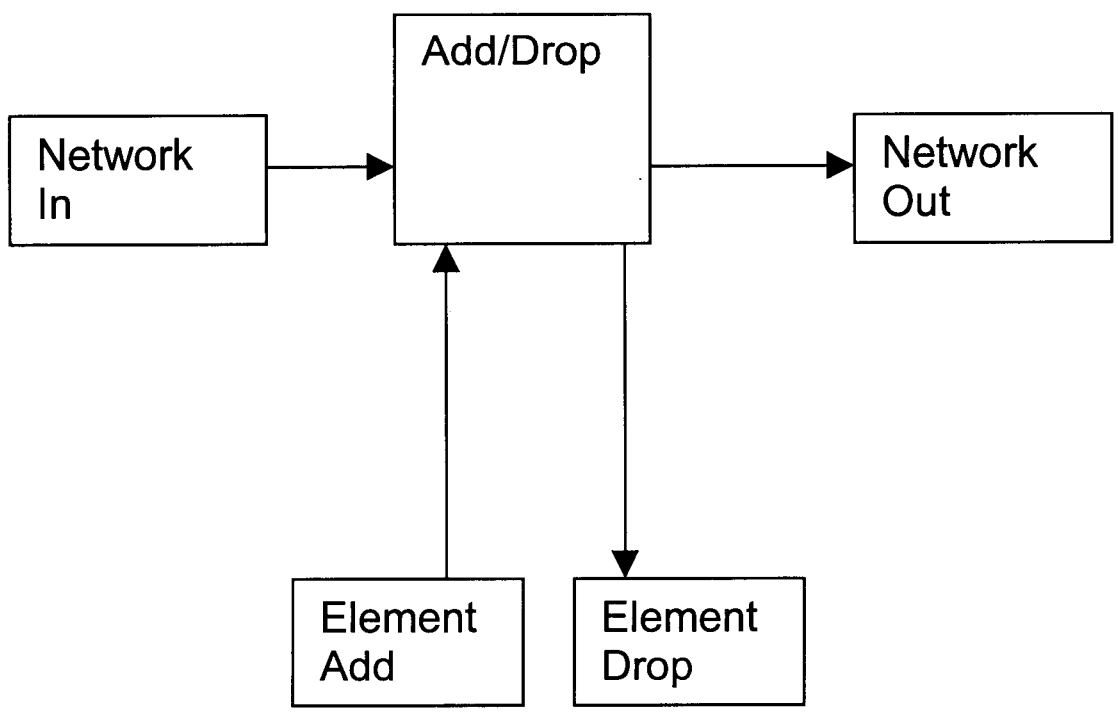
FIG. 7 illustrates a schematic diagram of an add/drop function.
Figure 8:
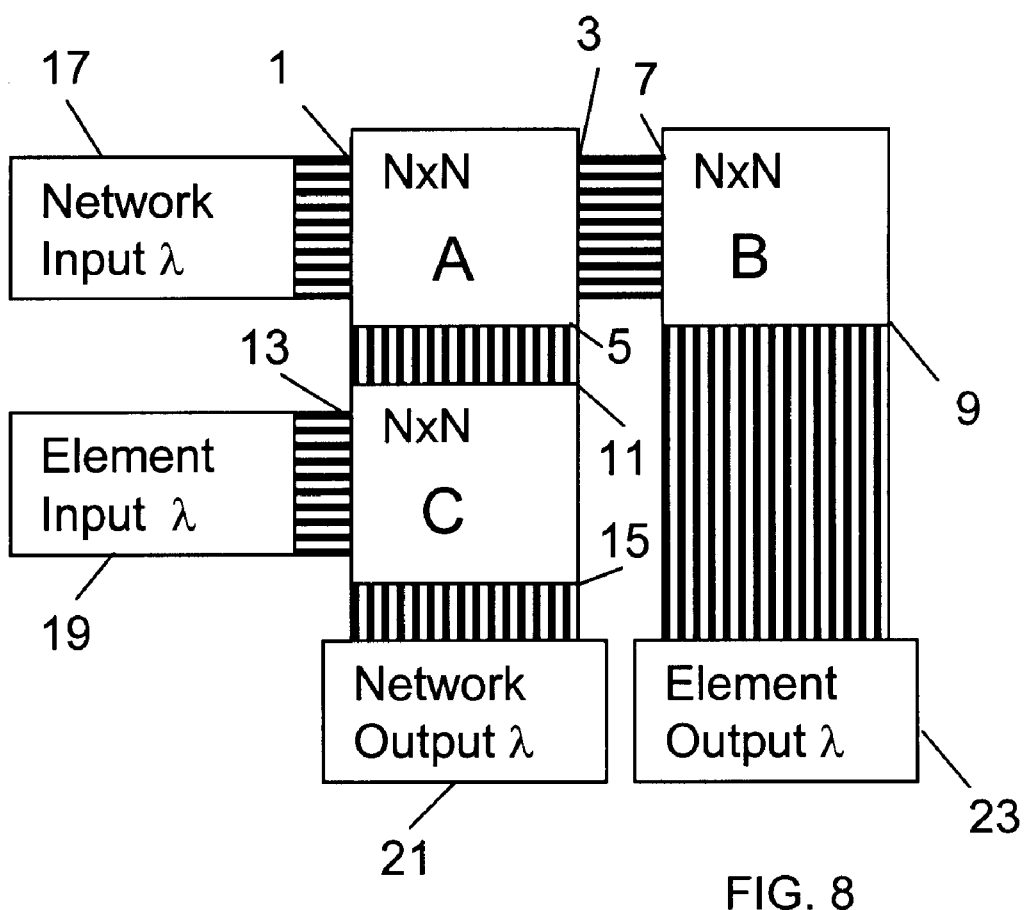
FIG. 8 illustrates a schematic layout of full add/drop functionality using only 3 N×N microwave crosspoint switch arrays according to the present invention.

FIG. 7 shows a schematic diagram illustrating an individual add/drop function. FIG. 8 shows a schematic layout of full add/drop functionality using only 3 N×N microwave crosspoint switch arrays. FIG. 8 shows three N×N crosspoint arrays labeled A, B, and C. Array A has N input lines 1, a first set of N output lines 3, and a second set of N output lines 5. Array B has N input lines 7 (corresponding to Array A's ouput lines 3) and N output lines 9. Array C has a first set of N input lines 11 (corresponding to Array A's ouput lines 5), a second set of N input lines 13, and a set of N ouput lines 15. A network input box 17 feeds into the N input lines 1 of Array A. An element input box 19 feeds into the N input lines 13 of Array C. A network ouput box 21 receives output from the N ouput lines 15 of array C. An element ouput box 23 receives ouput from the N ouput lines 9 of Array B.

As shown in FIG. 8, the system requires no coupling between the elenent input box 19 and the element output box 23. Additinally, the functionality shwown in FIG. 8 can be generalized to an (N+M)×(N+M) crosspoint switch array with N inputs from the network input box 17 and M inputs from the element input box 19 together with N outputs to the network output box 21 and M outputs to the element output box 23.

Figure 9:
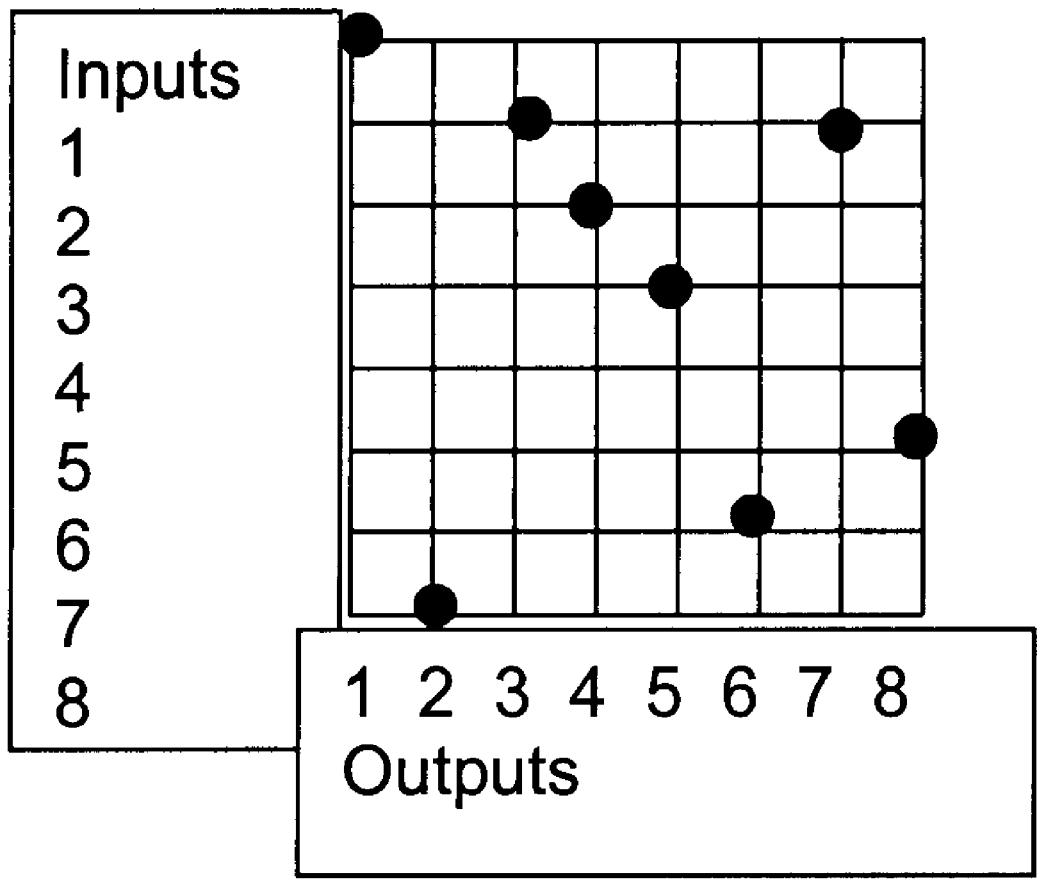
FIG. 9 illustrates a schematic diagram of a crosspoint switch.

Within each N×N crosspoint switch is the following structure shown in FIG. 9, which gives a schematic diagram of crosspoint switch. FIG. 9 shows N horiontal input lines and N vertical output lines for the case where N=8. Each of the N horizontal input lines is a bus which can be crossconnected via an N×N crosspoint switch array to each of the N vertical output lines. In the present invention, each microwave analog switch is capable of passing the highest data rate of the modulated light beam. For example, suppose that the data rate is OC 192 which corresponds to 10 Gb/s. The RF switches and the circuitry will be able to handle broadband signals up to 10 Gbps without significant introduction of losses, signal distortion, channel noise, or interchannel noise. This schematic diagram in FIG. 6 thus represents a chip which is addressible electronically by means not shown in the figure. This allows for dynamic changes of the switch configurations.

The switching time to go from one switching state is very forgiving. There is an interrogation timeof 30 milliseconds to determine if the switch is operating properly while located about 100 km from the control center. A small fraction of this interrogation time, say 1 millisecond, is all that is needed to operate the switch and be invisible to the user. Accordingly, the preferred crosspoint switch used in the present invention should have a switch time of not less than about 1 millisecond.

Another beneficial aspect of the present invention is that the functionality, defined as 1R, 2R, 2.5R or 3R, can be varied by the telecommunications system operator using a variety of microwave/digital cards. (Here 2.5R denotes the functionality of 3R with all operations carried out in the microwave domain so that the cost is typically between that of 2R and 3R components.) The number of input lines is divided into certain categories. Each of these categories can be assigned a functionality (1R, 2R, 2.5R or 3R) by inserting the proper card. The system operator can change these cards at any time to change the functionality. This is a fairly slow operation and it is not electronic in nature. But it serves the purpose of allowing the system operator to have more control and to fully optimize the telecommunications system.

Figure 10:
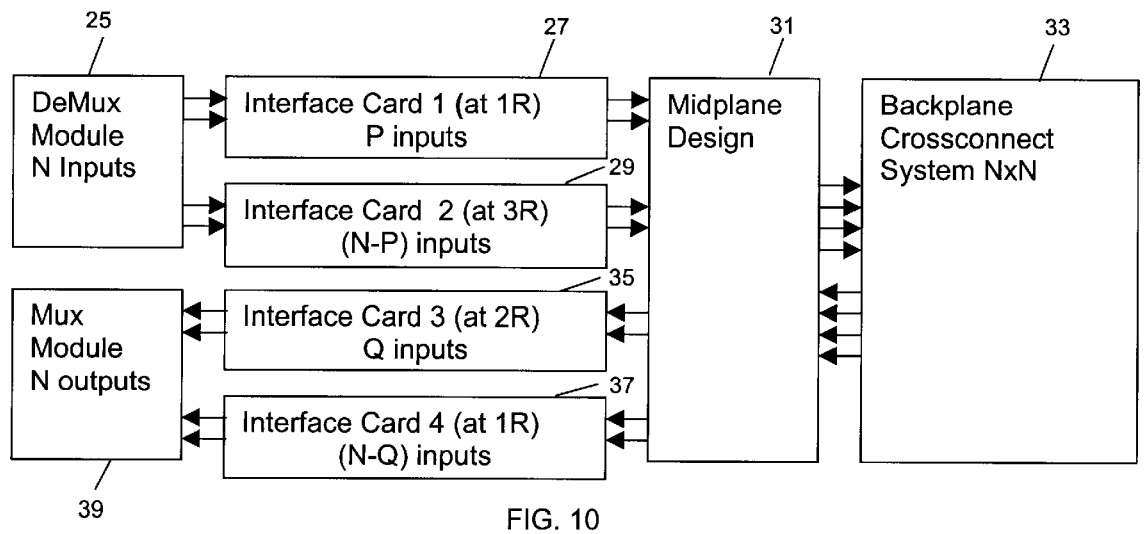
FIG. 10 illustrates a functional arrangement of system components for a switching architecture according to the present invention.

FIG. 10 shows a functional arrangement of system components for a switching architecture according to the present invention. A demux module 25 provides N inputs split into P inputs that go to a first interface card 27 and (N—P) inputs that go to a second interface card 29. These cards 27, 29 connect to a midplane design 31 that groups and transfers data to a backplane crossconnect system 33. Data coming from the crossconnect system 33 is transferred to the midplane design 31, which segments and transfers data to a third interface card 35 having Q inputs and a fourth interface card 37 having (N—Q) inputs. These cards 35, 37 together provide N outputs to a mux module 39. More generally, the interface cards 27, 29, 35, 37 may include other combinations for grooming (i.e., 1R, 2R, 2.5R, 3R) in addition to the combinations shown in FIG. 10.

As shown at the left side of FIG. 10, there are 4 inputs arising from a demuxing operation of the input light. These four are split with 2 inputs going into interface card 1 having 1R functionality and 2 inputs going into interface card 2 having 3R functionality. These signals are combined at the midplane and are sent to the backplane N×N crossbar switch array which in this case is a 4×4 crossbar switch array. Following the switch array, the signals again pass through the midplane and are then split into 2 inputs going into each of the interface cards. In this figure, 2 outputs go into interface card 3 having 2R functionality and two outputs go into interface card 4 having 1R functionality.

The system operator can add or subtract these and similar cards in any order and with any functionality to optimize system performance.

Figure 11:
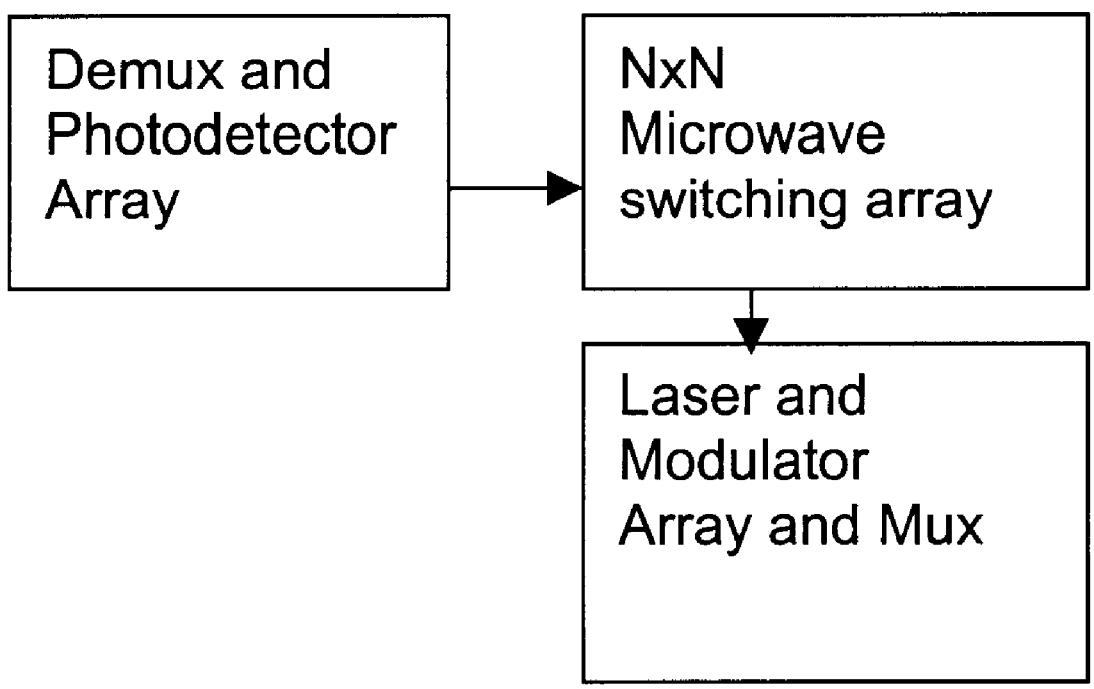
FIG. 11 illustrates a schematic of a crosspoint switch using microwave technology.

The N×N backplane crossconnect system shown in FIG. 10 can be understood as the N×N microwave switching array shown in FIG. 11. In FIG. 11, the crossconnect switch is constructed using microwave technology. The optical input is converted by a demuxer to individual wavelengths λ and then through a photodetector array into an array of individual microwave signals which form the inputs for the crossconnect switch. Switching occurs in the microwave domain, instead of the optical domain. Each microwave switch output is subsequently reconverted by a laser/modulator array and a mux to the optical output.

Conventional microwave switching arrays reported in the literature use digital microwave switches. The switches convert each incoming digital stream of 0's and 1's into another digital stream with the same amplitude and waveform shape. The digital switches are totally active and respond to the actual bit rate. For example, a switch which is designed for B=10 Gbps must actively respond to this data rate. The time for this operation is of the order of 1/B which for this example is 100 ps. This data switching operation is to be contrasted to the state switching operation where the switching node at position (m,n) is switched to another switching node at position (m', n'). The state switching time can be very long, up to several milliseconds.

Figure 12:
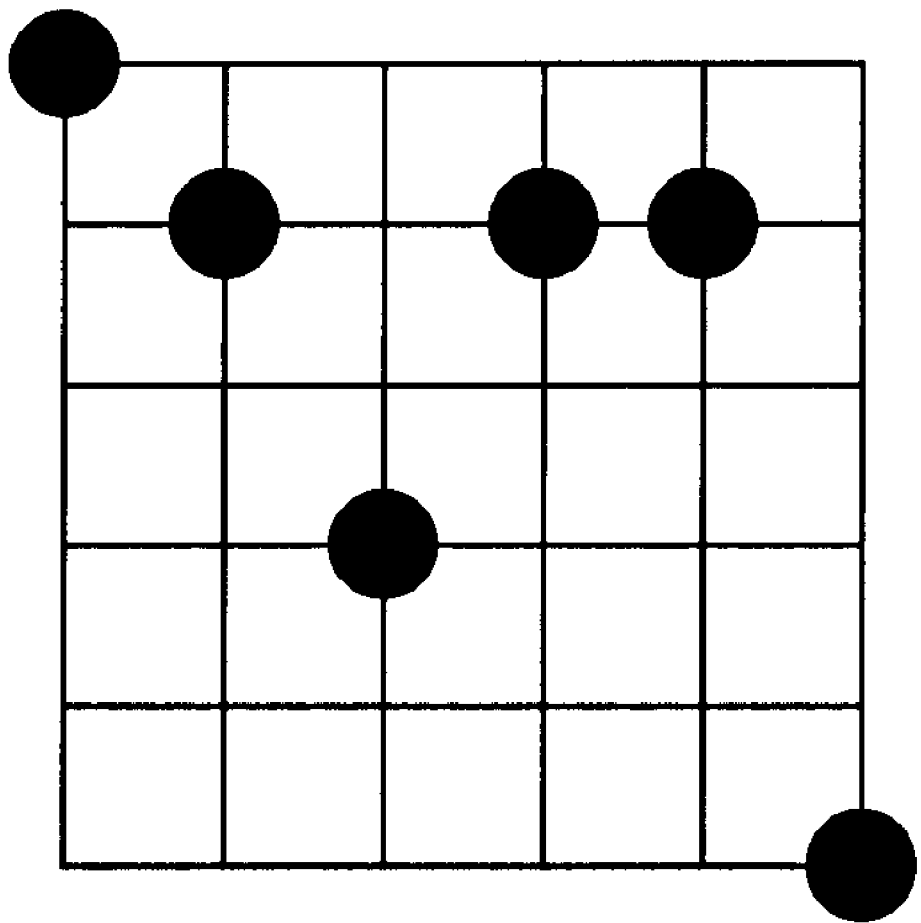
FIG. 12 illustrates an example of a one-to-many switch.

Also, conventional microwave switching arrays reported in the literature have the ability of one-to-many logic, wherein one input signal can be routed to many output ports, as shown in FIG. 12. In the case shown in FIG. 12, row 2 is connected to columns 2, 4 and 5. The switches are integrated on chips of Si, GaAs or other material. Because of power dissipation and chip yields, the value of N is relatively small. For B=2.5 Gbps, the maximum of N=68 giving a B×N product of 170. For B=10 Gbps the maximum value of N is 16 giving a B×N product of 160. The product of B×N for a single chip seems to be limited to <200. The limitation arises from the great number of active devices, their yield, and their power consumption and dissipation.

The reason for one-to-many requirement in the above switches is their application in digital signal processing at the R3 functionality of a telecommunications system. The terminology R3 refers to regeneration, reshaping and retiming. This is done at the very lowest level of a telecommunications system, and it requires the highest cost.

Figure 13:
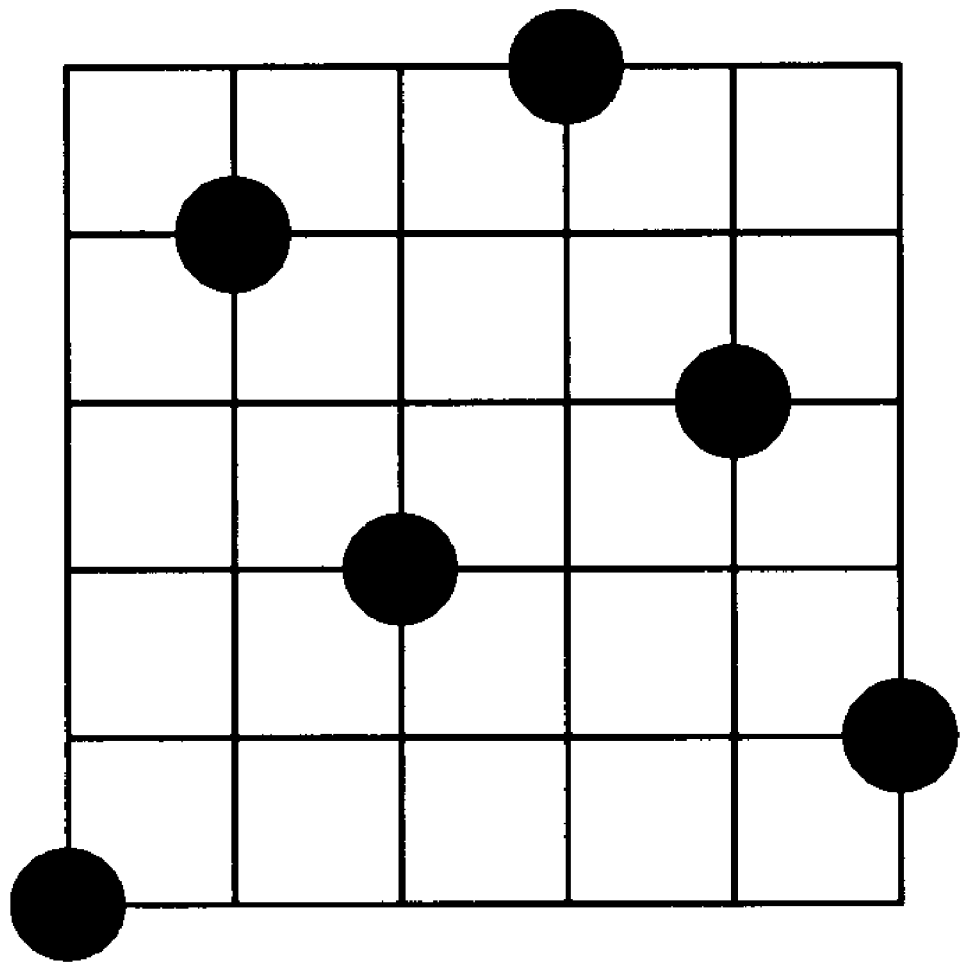
FIG. 13 illustrates an example of an N×N permutation switch.

By contrast, in the present invention, only wavelengths are switched and this competes in the R1 arena, where the signal need only be regenerated. This requires only a one-to-one functionality. Accordingly, what is known as permutation switching array can be used. A switching array with only one row attached to any column and only column attached to any row is called a permutation switching array, as illustrated in FIG. 13.

There are N! possible combinations of switching arrangements for a permutation switch. This functionality is not as general as that of the one-to-many array described above, but it has the advantage that it sufficient for the desired application involving wavelength crossconnect switching. The permutation switching array allows a departure from the digital logic switches that were the limitation as described above.

With a constraint of a permutation switch, it is possible to use microwave analog switches as passthrough switches of a crossbar array. Each switch occurs each node and directs the signals from the input rows to the output columns.

Figure 14:
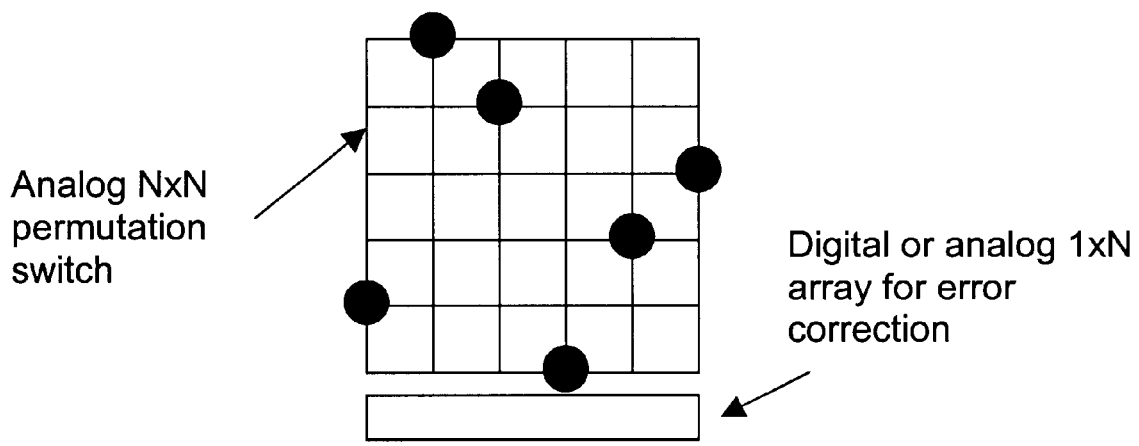
FIG. 14 illustrates an example of an analog N×N permutation switch with digital or analog array at output for error correction.

Switches in the preferred embodiment are passive. They are technically known as "DC wideband switches". When the switch is activated by digital circuitry in the control plane (not shown in the figure) the switch becomes either fully open (lets the signal pass) or fully closed (prevents the signal from passing). The signal becomes reduced in amplitude by this operation and may also become somewhat distorted in shape. These defects are simply corrected by the addition of a digital 1×N switch matrix at the output, as shown in FIG. 14. FIG. 14 shows an example of an analog N×N permutation switch with digital or analog array at output for error correction.

There are several main criteria necessary to inexpensively transmit and switch digital signals in an error-free and inexpensive manner: (1) the transmission line impedance should be everywhere fixed at a standard value which is usually of 50 ohms over the entire line, including the open switches and the line terminations, (2) the RC time constant ($\tau$) must be small enough to satisfy the inequality $\tau<1/(2\pi B)$, (3) the impedance of the line should not be affected by the switching permutations, (4) the power dissipation and crosstalk should be minimal, and (5) the technology should allow large products of B×N>>200.

All these criteria can be satisfied by employing an N×N permutation array of analog microwave switches followed by a 1×N array of digital or analog switches to correct for the slight signal distortions of the digital signals passing through the array.

The choice of substrate material should also be considered. Given the requirements above, it is possible to fabricate the permutation switch using silicon as a chip material or alternatively using gallium arsenide, indium phosphate, etc.

Present BN products have a maximum value of 200. Much higher values are achievable with the present invention, such as:

(a) B=40 Gbps, N=100 which has a BN product of 4,000.
(b) B=10 Gbps and N=500, which has a BN product of 5,000.
(c) B=40 Gbps, N=500 which has a BN product of 20,000

All of these greatly exceed 200.

Figure 15:
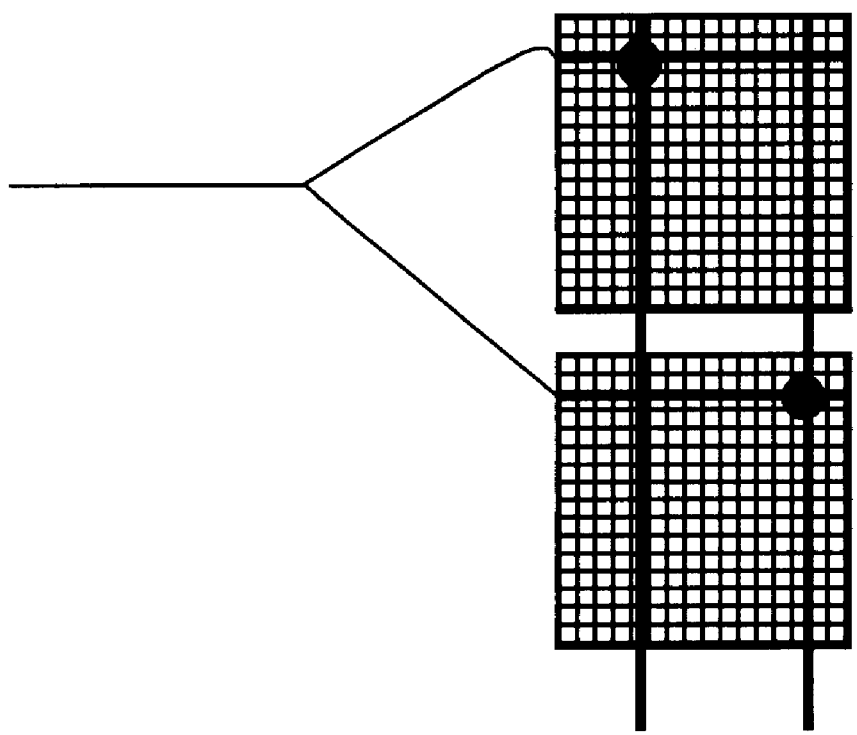
FIG. 15 illustrates an example of a hard-wired One-To-Two functionality using only permutation switches.

For certain applications, a one-to-two functionality is needed. It is possible to have a one-to-two functionality by hard wiring only permutation switches, as shown in FIG. 15. FIG. 15 shows an example of hard-wired one-to-two functionality using only permutation switches A single wavelength at the left of FIG. 15 is split into two with each one accessing the same row of a permutation switch. The DC high bandwidth switches shown in the figure as dots, address different columns. These columns are connected vertically. As shown in the figure, one row, repeated twice, now addresses two columns, as desired.

It is also possible to use mechanical motion to produce the DC high bandwidth analog switches needed for the invention. These switches can be manufactured on a printed circuit board. Mechanical motion opens and closes a switch, and is similar to the operation of a relay. A miniaturized relay switch can be implemented using a piezoelectric transducer at each node of the crosspoint switch. Upon application of a voltage, each piezoelectric transducer undergoes a small mechanical displacement. This can be used to open or close a switch. There are $N^2$ such piezoelectric elements needed in the proposed permutation switch. The mechanical motion aligns one row with one column and creates an open circuit.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An add/drop apparatus comprising:

a plurality of interconnected N×N crossconnect microwave arrays, a first array having N input lines and 2N output lines, a second array having N input lines and N output lines, and a third array having 2N input lines and N output lines, wherein N is greater than zero, and wherein the plurality of interconnected N×N crossconnect microwave arrays are configured to switch a plurality of input microwave signals to a plurality of output microwave signals, wherein the plurality of input microwave signals are generated from a plurality of input optical signals corresponding thereto and a plurality of output optical signals are generated from the plurality of output microwave signals corresponding thereto, to add/drop optical signals from input lines of the apparatus to output lines of the apparatus; and a plurality of reshaping circuits, the reshaping circuits being coupled to output lines of the apparatus.

2. An apparatus according to claim 1 wherein each of the reshaping circuits use only analog circuit elements.

3. An apparatus according to claim 2 wherein each of the analog circuit elements includes a voltage threshold device in series with a voltage limiter.

4. An apparatus according to claim 1 wherein each of the plurality of interconnected N×N crossconnect arrays include only analog circuit elements.

5. An apparatus according to claim 4 wherein the plurality of interconnected N×N crossconnect arrays is a minimum of three.

6. An apparatus according to claim 1 wherein the plurality of interconnected N×N crossconnect arrays is a minimum of three.

7. An add/drop apparatus comprising:
a plurality of interconnected crossconnect microwave arrays, a first array having N input lines and M output lines, coupled to a second array having N input lines and N output lines, and coupled to a third array having M input lines and N output lines, wherein M and N are each greater than zero, and
wherein the plurality of interconnected crossconnect microwave arrays are configured to switch a plurality of input microwave signals to a plurality of output microwave signals, wherein the plurality of input microwave signals are generated from a plurality of input optical signals corresponding thereto and a plurality of output optical signals are generated from the plurality of output microwave signals corresponding thereto, to add/drop optical signals from input lines of the apparatus to output lines of the apparatus; and
a plurality of reshaping circuits, the reshaping circuits being coupled to output lines of the apparatus.

8. An apparatus according to claim 7 wherein each of the reshaping circuits use only analog circuit elements.

9. An apparatus according to claim 8 wherein each of the analog circuit elements includes a voltage threshold device in series with a voltage limiter.

10. An apparatus according to claim 7 wherein each of the plurality of interconnected crossconnect arrays include only analog circuit elements.

11. An apparatus according to claim 10 wherein the plurality of interconnected crossconnect arrays is a minimum of three.

12. An apparatus according to claim 7 wherein the plurality of interconnected crossconnect arrays is a minimum of three.

13. An apparatus according to claim 1, further comprising:
converter means coupled to input lines of the apparatus for generating the input microwave signals corresponding to the input optical signals.

14. An apparatus according to claim 1, further comprising:
converter means coupled to output lines of the apparatus for generating the output optical signals corresponding to the output microwave signals.

15. An apparatus according to claim 1, further comprising:
a plurality of retiming circuits, the retiming circuits being coupled to output lines of the apparatus.

16. An apparatus according to claim 7, further comprising:
converter means coupled to input lines of the apparatus for generating the input microwave signals corresponding to the input optical signals.

17. An apparatus according to claim 7, further comprising:
converter means coupled to output lines of the apparatus for generating the output optical signals corresponding to the output microwave signals.

18. An apparatus according to claim 7, further comprising:
a plurality of retiming circuits, the retiming circuits being coupled to output lines of the apparatus.

19. An apparatus for adding/dropping optical signals, comprising:
a first plurality of N×M crosspoint microwave switch arrays comprising N inputs and M outputs, coupled to a second plurality of N×N crosspoint microwave switch arrays comprising N inputs and N outputs, and coupled to a third plurality of M×N crosspoint microwave switch arrays comprising M inputs and N outputs, wherein M and N are each greater than zero,
wherein the plurality of crosspoint microwave switch arrays are configured to switch a plurality of input microwave signals to a plurality of output microwave signals, wherein the plurality of input microwave signals are generated from a plurality of input optical signals corresponding thereto and a plurality of output optical signals are generated from the plurality of output microwave signals corresponding thereto, to add/drop optical signals from input lines of the apparatus to output lines of the apparatus; and
a plurality of reshaping circuits, wherein inputs of the plurality of reshaping circuits are coupled to the outputs of the third plurality of M×N crosspoint microwave switch arrays, and wherein outputs of the plurality of reshaping circuits are coupled to the output lines of the apparatus.

20. The apparatus of claim 19, comprising:
converter means coupled to input lines of the apparatus for generating the input microwave signals corresponding to the input optical signals; and
converter means coupled to output lines of the apparatus for generating the output optical signals corresponding to the output microwave signals.

* * * * *